(12) United States Patent
Nakajima et al.

(10) Patent No.: US 10,611,113 B2
(45) Date of Patent: Apr. 7, 2020

(54) RESIN PANEL AND FORMING METHOD

(71) Applicant: KYORAKU CO., LTD., Kyoto (JP)

(72) Inventors: Sho Nakajima, Kanagawa (JP); Takehiko Sumi, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 590 days.

(21) Appl. No.: 14/915,764

(22) PCT Filed: Aug. 20, 2014

(86) PCT No.: PCT/JP2014/071797
§ 371 (c)(1),
(2) Date: Mar. 1, 2016

(87) PCT Pub. No.: WO2015/033780
PCT Pub. Date: Mar. 12, 2015

(65) Prior Publication Data
US 2016/0200032 A1    Jul. 14, 2016

(30) Foreign Application Priority Data

Sep. 6, 2013  (JP) ................................ 2013-185465
Sep. 6, 2013  (JP) ................................ 2013-185467

(51) Int. Cl.
*B29C 51/26*   (2006.01)
*B29D 99/00*   (2010.01)
(Continued)

(52) U.S. Cl.
CPC .......... *B29D 99/0014* (2013.01); *B29B 11/10* (2013.01); *B29C 51/02* (2013.01);
(Continued)

(58) Field of Classification Search
None
See application file for complete search history.

(56) References Cited

U.S. PATENT DOCUMENTS 4,423,000 A  *  12/1983  Teraoka ................. A43B 13/20
                                                                264/524
4,592,718 A     6/1986  Teraoka
(Continued)

FOREIGN PATENT DOCUMENTS

EP    0 652 138        5/1995
JP    57-157726        9/1982
(Continued)

OTHER PUBLICATIONS

Official Action, along with English-language translation thereof, issued in JP Appl. No. 2013-185467 dated Jul. 25, 2017.
(Continued)

*Primary Examiner* — Monica A Huson
(74) *Attorney, Agent, or Firm* — Maier & Maier, PLLC

(57) ABSTRACT

Provided is a resin panel without warpage, in which weight reduction and high rigidity of the resin panel have been promoted. The resin panel according to an aspect of the present invention is a resin panel having a back wall, a front wall facing the back wall with a gap therebetween, and ribs formed by having portions of the back wall depressed toward the front wall and welded to the inner surface of the front wall, characterized in that the back wall, the front wall and the ribs are configured by mold-clamping, in a split mold, a first molten resin in a molten state and incorporating a plate-shaped filler, which constitutes the back wall, and a second molten resin in a molten state and incorporating a plate-shaped filler, which constitutes the front wall, the first molten resin and the second molten resin having been extruded and flowed out from an extrusion apparatus, and the longitudinal direction of the ribs is non-parallel to the direction of flow of the first molten resin and the second molten resin.

5 Claims, 8 Drawing Sheets

(51) Int. Cl.
  *B29B 11/10*    (2006.01)
  *B29C 51/02*    (2006.01)
  *B29C 51/10*    (2006.01)
  *B32B 3/30*     (2006.01)
  *B32B 3/28*     (2006.01)
  *B32B 27/08*    (2006.01)
  *B32B 7/05*     (2019.01)
  *B29K 23/00*    (2006.01)
  *B29K 105/16*   (2006.01)
  *B29K 509/00*   (2006.01)
  *B29L 31/30*    (2006.01)
  *B29K 105/06*   (2006.01)
  *B29C 51/12*    (2006.01)
  *B29C 51/00*    (2006.01)
  *B29C 48/375*   (2019.01)
  *B29C 48/00*    (2019.01)
  *B29C 48/30*    (2019.01)
  *B29C 48/07*    (2019.01)
  *B29C 48/31*    (2019.01)

(52) U.S. Cl.
  CPC ............ *B29C 51/10* (2013.01); *B32B 3/28* (2013.01); *B32B 3/30* (2013.01); *B32B 7/05* (2019.01); *B32B 27/08* (2013.01); *B29C 48/0017* (2019.02); *B29C 48/07* (2019.02); *B29C 48/30* (2019.02); *B29C 48/313* (2019.02); *B29C 48/388* (2019.02); *B29C 51/006* (2013.01); *B29C 51/12* (2013.01); *B29C 51/267* (2013.01); *B29K 2023/04* (2013.01); *B29K 2023/10* (2013.01); *B29K 2105/06* (2013.01); *B29K 2105/16* (2013.01); *B29K 2509/14* (2013.01); *B29L 2031/3017* (2013.01); *B32B 2307/558* (2013.01); *B32B 2307/718* (2013.01); *B32B 2419/04* (2013.01); *B32B 2605/00* (2013.01)

(56) References Cited

U.S. PATENT DOCUMENTS

| | | |
|---|---|---|
| 2007/0203300 A1 | 8/2007 | Sumi et al. |
| 2010/0104788 A1 | 4/2010 | Kitano et al. |
| 2012/0060960 A1* | 3/2012 | Sumi .................. B29C 47/0021 |
| | | 138/141 |
| 2013/0089693 A1 | 4/2013 | Kitano et al. |

FOREIGN PATENT DOCUMENTS

| | | |
|---|---|---|
| JP | 7-237512 | 9/1995 |
| JP | 10-235720 | 9/1998 |
| JP | 2008-265078 | 11/2008 |
| JP | 2010/201662 | 9/2010 |
| JP | 2011-235951 | 11/2011 |
| JP | 2012-176604 | 9/2012 |
| WO | 2008/123158 | 10/2008 |
| WO | 2013/077198 | 5/2013 |

OTHER PUBLICATIONS

International Search Report issued in PCT/JP2014/071797, dated Nov. 11, 2014.
Office Action issued in European Patent Office (EPO) Counterpart Patent Appl. No. 14842105.0, dated Apr. 24, 2018.

* cited by examiner

FIG. 11(a)
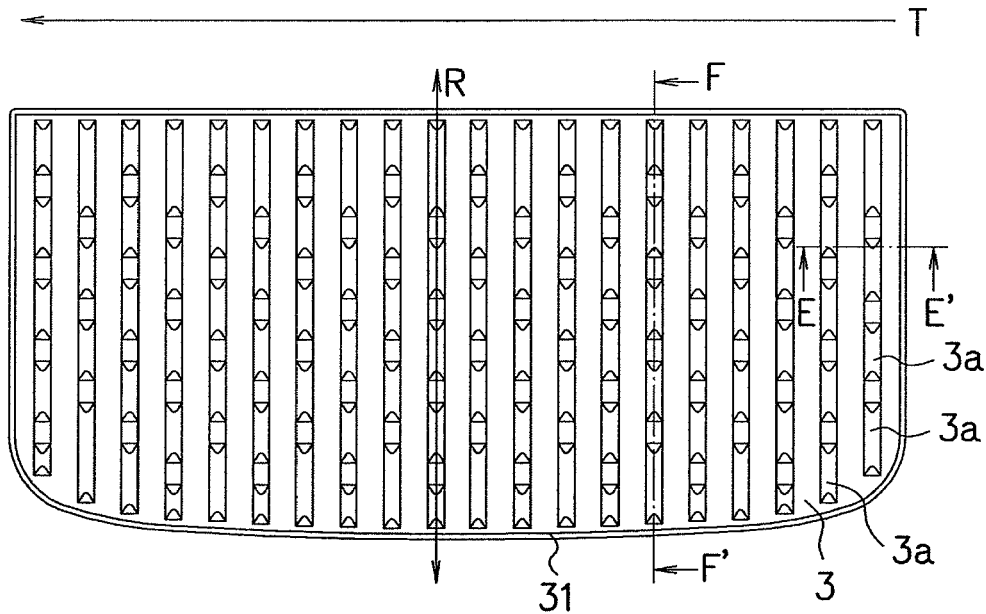
FIG. 11(b)
FIG. 11(c)
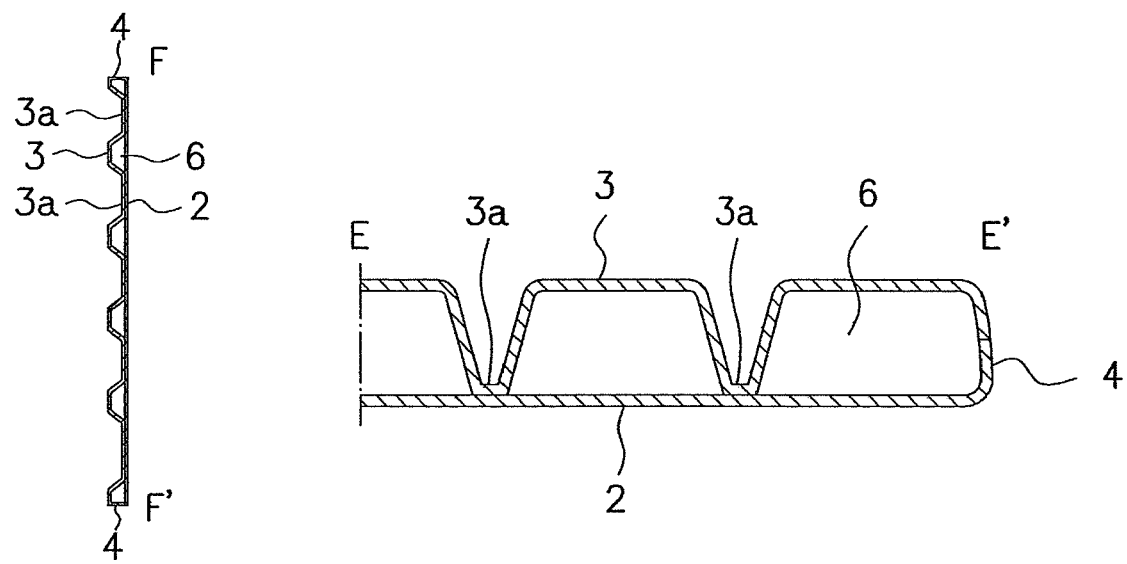

FIG. 12

| | RESIN MATERIAL | RIB SHAPE | WARPAGE |
|---|---|---|---|
| EXAMPLE 1 | TALC BLEND (PP+PE+TALC 30%) | PERPENDICULAR TO DIRECTION OF FLOW OF RESIN | ABSENT |
| COMPARATIVE EXAMPLE 1 | TALC BLEND (PP+PE+TALC 30%) | PARALLEL TO DIRECTION OF FLOW OF RESIN | ABSENT |
| COMPARATIVE EXAMPLE 2 | GLASS BLEND (PP+PE+SHORT GLASS FIBERS 30%) | PERPENDICULAR TO DIRECTION OF FLOW OF RESIN | ABSENT |
| COMPARATIVE EXAMPLE 3 | GLASS BLEND (PP+PE+SHORT GLASS FIBERS 30%) | PARALLEL TO DIRECTION OF FLOW OF RESIN | PRESENT |

RESIN PANEL AND FORMING METHOD

TECHNICAL FIELD

The present invention relates to a panel made of a resin, such as a package tray, a deck board or a floor board installed in the luggage compartments of vehicles.

BACKGROUND ART

As a technical reference document filed by the present applicant, for example, Patent Document 1 (JP 10-235720 A) discloses a technology of molding a panel with skin by blow molding a cylindrically shaped molten resin.

According to Patent Document 1, a panel with skin is to be molded by thermally welding a skin material to the outer surface of one wall under the blow pressure during blow molding, and forming, on the other wall, inner ribs that are caused to protrude until the inner ribs are brought into contact with the aforementioned wall.

However, in a case in which a cylindrically shaped molten resin is used as in the case of Patent Document 1, since the molten resin at the part where the inner ribs are to be formed is stretched out, it is necessary to make the wall thickness of the cylindrically shaped molten resin thick so that pinholes are not generated. As a result, there is a problem that the weight of the panel with skin to be finally molded becomes heavy. Therefore, in a case in which a cylindrically shaped molten resin is used as in the case of Patent Document 1, there is a problem that it is difficult to promote the weight reduction of the resin panel to be finally molded.

Usually, the thickness (wall thickness) of a cylindrically shaped molten resin (cylindrical parison) is made uniform. Also, when parts of a split mold are clamped, the pressing force of pressing the cylindrical parison against the split mold becomes even over the entire surface of the cylindrical parison. Therefore, the parison that is pressed against one part of the split mold, on which ribs such as inner ribs are formed, is stretched out in accordance with the blow ratio set in relation to the ribs, and local thin portions are produced in the finally molded resin panel on the side that is pressed against this part of the split mold. On the other hand, thin portions are not produced on the side of the panel that is pressed against the part of the split mold without ribs. As a result, it is necessary to set the thickness of the cylindrical parison in accordance with the thin portion generated on the one part of the split mold on which ribs are formed, and this causes the panel thicker than required that is produced on the other part of the split mold. Therefore, in a case in which a cylindrical parison necessarily having a uniform thickness is used, a problem arises that it is difficult to reduce the weight of the finally molded resin panel, because the wall on which ribs are not formed after blow molding becomes thicker than the wall on which ribs are formed.

Furthermore, in the case of using a cylindrically shaped molten resin, one wall and the other wall are constructed from the same molten resin material. Therefore, there is also a problem that it is difficult to partially enhance the impact resistance only by means of the resin material that constitutes the one wall and the other wall. Given such a situation, it is necessary to achieve weight reduction of the resin panel and to obtain a resin panel with enhanced impact resistance.

Meanwhile, in order to promote weight reduction of a resin panel, for example, the weight reduction can be realized by using a pair of thermoplastic resin sheets extruded from an extrusion apparatus as in the case of Patent Document 2 (JP 2010-201662 A). According to Patent Document 2, a pair of thermoplastic resin sheets extruded from an extrusion apparatus is disposed in a pair of split mold parts. Therefore, when the wall thickness of the thermoplastic resin that is extruded into the split mold part on which ribs are formed, and the wall thickness of the thermoplastic resin that is extruded into the other split mold part on which ribs are not formed are separately adjusted, and when causing the wall thickness of the thermoplastic resin that is extruded into the other split mold part on which ribs are not formed, to be unnecessarily thick is avoided, the weight reduction of the resin panel to be finally molded can be promoted.

PRIOR ART REFERENCE

Patent Document

Patent Document 1: JP 10-235720 A
Patent Document 1: JP 2010-201662 A

SUMMARY OF INVENTION

Problems to be Solved by the Invention

Meanwhile, in order to increase the rigidity of a resin panel, it is preferable to mix a highly anisotropic filler such as glass fibers with the resin to mold the resin panel.

However, it was discovered that when a resin panel having the ribs described above is molded by extruding a resin mixed with a highly anisotropic filler such as glass fibers, through the extrusion apparatus described above, there are occasions in which warpage occurs in the finally molded resin panel. This warpage occurs noticeably in a case in which the longitudinal direction of the ribs formed in the resin panel is parallel to the direction of flow of the resin that has flowed out by being extruded from an extrusion apparatus. Therefore, in order to further promote improvement of the resin panel, it is also necessary to obtain a resin panel without warpage while promoting weight reduction and high rigidity of the resin panel.

An object of the present invention is to obtain a resin panel in which weight reduction and impact resistance of the resin panel have been enhanced, and preferably, to obtain a resin panel without warpage while also promoting weight reduction and high rigidity of the resin panel.

Means for Solving to the Problems

The resin panel according to an aspect of the present invention is a resin panel having a back wall; a front wall facing the back wall with a gap therebetween; and ribs formed by having portions of the back wall depressed toward the front wall and welded to the inner surface of the front wall, characterized in that the back wall, the front wall and the ribs are configured by mold-clamping, in a split mold, a first molten resin in a molten state, which constitutes the back wall and into which a plate-shaped filler has been incorporated, and a second molten resin in a molten state, which constitutes the front wall and into which a plate-shaped filler has been incorporated, the first molten resin and the second molten resin having been extruded and flowed out from an extrusion apparatus, and that the longitudinal direction of the ribs is non-parallel to the direction of flow of the first molten resin and the second molten resin.

The resin panel according to an aspect of the present invention is a resin panel having a back wall; and a front wall facing the back wall with a gap therebetween, characterized in that the back wall and the front wall are configured by mold-clamping, in a split mold, a first molten resin in a molten state, which constitutes the back wall, and a second molten resin in a molten state, which constitutes the front wall, the first molten resin and the second molten resin having been extruded from an extrusion apparatus, and that the second molten resin is composed of a material having higher impact resistance than that of the first molten resin, while the front wall is constructed from a material having higher impact resistance than that of the back wall.

Advantageous Effects of the Invention

According to the present invention, a resin panel with reduced weight and enhanced impact resistance can be obtained, and also, a resin panel without warpage can be obtained while weight reduction and high rigidity of the resin panel are promoted.

BRIEF DESCRIPTION OF THE DRAWINGS

FIGS. 1(a)-1(d) are diagrams illustrating a configuration example of the resin panel 1 of the present embodiment, in which FIG. 1(a) is an overall perspective view diagram of the resin panel 1, FIG. 1(b) is a top view diagram of the resin panel 1 illustrated in FIG. 1(a), FIG. 1(c) is an A-A' cross-sectional view diagram illustrated in FIG. 1(a) and FIG. 1(b), and FIG. 1(d) is a B-B' cross-sectional view diagram illustrated in FIG. 1(a) and FIG. 1(b).

FIGS. 11(a)-11(c) are diagrams illustrating a configuration example of the resin panel 1 of the present Example, in which FIG. 11(a) is an overall perspective view diagram of the resin panel 1, FIG. 11(b) is an F-F' cross-sectional view diagram illustrated in FIG. 11(a), and FIG. 11(c) is an E-E' cross-sectional view diagram illustrated in FIG. 11(a).

FIG. 12 is a diagram illustrating the test results of Examples.

DESCRIPTION OF THE EMBODIMENTS

<Outline of Resin Panel 1 According to One Aspect of Present Invention>

Figure 8:
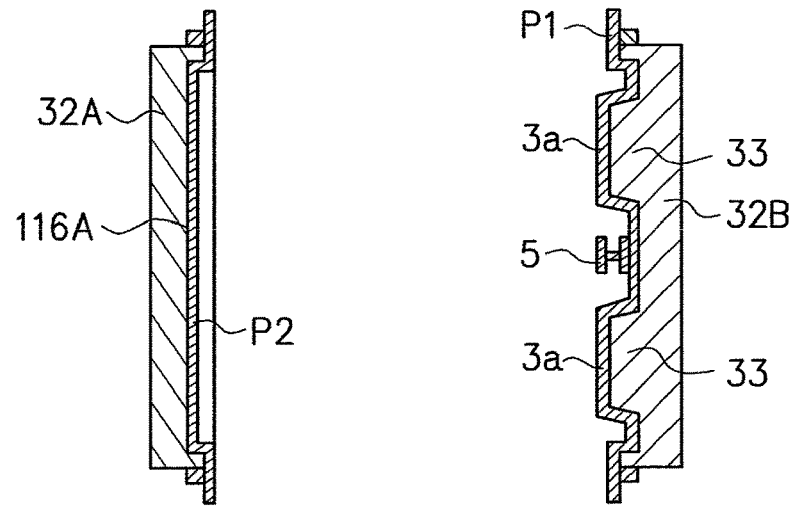
FIG. 8 is a sixth diagram illustrating a molding process example for the resin panel 1.
Figure 9:
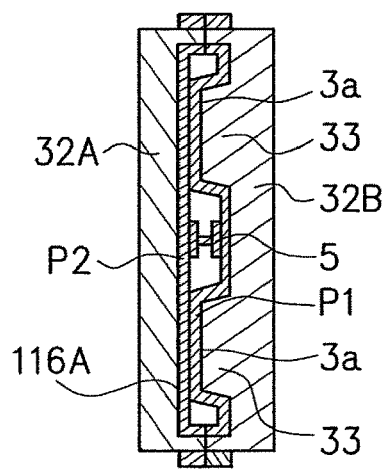
FIG. 9 is a seventh diagram illustrating a molding process example for the resin panel 1.

First, an outline of the resin panel 1 according to an aspect of the present invention will be explained with reference to FIG. 1, FIG. 2, FIG. 8 and FIG. 9. FIG. 1 illustrates a configuration example of the resin panel 1 according to an aspect of the present invention, and FIG. 2 illustrates a configuration example of a molding apparatus for molding the resin panel 1 illustrated in FIG. 1. FIG. 8 and FIG. 9 illustrate parts of the molding process for the resin panel 1.

As illustrated in FIG. 1, the resin panel 1 according to an aspect of the present invention is a resin panel 1 having a back wall 3; a front wall 2 facing the back wall 3 with a gap therebetween; and ribs 3a formed by having portions of the back wall 3 depressed toward the front wall 2 and welded to the inner surface of the front wall 2.

In the resin panel 1 according to an aspect of the present invention, the back wall 3, the front wall 2 and the ribs 3a are configured by, for example, mold-clamping, in a split mold 32, a first molten resin P1 in a molten state and incorporating a plate-shaped filler, which constitutes the back wall 3, and a second molten resin P2 in a molten state and incorporating a plate-shaped filler, which constitutes the front wall 2, the first molten resin and the second molten resin having been extruded and flowed out from an extrusion apparatus 12 illustrated in FIG. 2. Thus, a resin panel 1 in which the longitudinal direction of the ribs 3a is non-parallel to the direction of flow of the first molten resin P1 and the second molten resin P2, is obtained. For example, the longitudinal portion 3a1 that constitutes the longitudinal direction of a rib 3a illustrated in FIG. 1 is formed in a perpendicular direction that is non-parallel to the direction of flow of the first molten resin P1 and the second molten resin P2. In FIG. 1, the direction of flow of the first molten resin P1 and the second molten resin P2 is the B-B' direction, and is the longitudinal direction of the resin panel 1. Also, the direction perpendicular to the direction of flow is the A-A' direction, and is the transverse direction of the resin panel 1.

To mold the resin panel 1 according to an aspect of the present invention, first, as illustrated in FIG. 2, a first molten resin P1 in a molten state and incorporating a plate-shaped filler, which constitutes the back wall 3, and a second molten resin P2 in a molten state and incorporating a plate-shaped filler, which constitutes the front wall 2, having been extruded and flowed out from an extrusion apparatus 12, are suspended between a pair of split mold parts 32.

Next, as illustrated in FIG. 8, the first molten resin P1 and the second molten resin P2 are suctioned to the surface of the cavity 116 of the split mold 32, and the first molten resin P1 and the second molten resin P2 are formed into the shape conforming to the cavity 116.

Next, as illustrated in FIG. 9, the split mold parts 32 are clamped, and thus, a resin panel 1 in which the ribs 3a are formed such that the longitudinal direction of the ribs 3a is non-parallel to the direction of flow of the first molten resin P1 and the second molten resin P2, is molded.

In the resin panel 1 according to an embodiment of the present invention, the back wall 3, the front wall 2 and the ribs 3a are configured by mold-clamping, in a split mold 32, a first molten resin P1 in a molten state and incorporating a plate-shaped filler, which constitutes the back wall 3, and a second molten resin P2 in a molten state and incorporating a plate-shaped filler, which constitutes the front wall 2, having been extruded and flowed out from an extrusion apparatus 12. Thus, a resin panel 1 in which the longitudinal direction of the ribs 3a is non-parallel to the direction of flow of the first molten resin P1 and the second molten resin P2, is configured.

In regard to the resin panel 1 according to an aspect of the present invention, weight reduction of the resin panel 1 can be promoted by using a molding apparatus illustrated in FIG. 2. Here, in order to increase the rigidity of the resin panel 1, it is usually preferable to incorporate a highly anisotropic filler such as glass fibers into the resin to perform molding. However, when a resin panel 1 having ribs 3a is molded by extruding a resin incorporating a highly anisotropic filler such as glass fibers from an extrusion apparatus 12, warpage may occur in the finally molded resin panel 1 in some occasions. This warpage occurs noticeably in a case in which the longitudinal direction of the ribs 3a formed on the resin panel 1 is parallel to the direction of flow of the resin that has been extruded and flowed out from the extrusion apparatus 12. Therefore, the inventor molded a resin panel 1 in which the ribs 3a were formed such that the longitudinal direction of the ribs 3a was non-parallel to the direction of flow of the resin that had been extruded and flowed out from the extrusion apparatus 12 by extruding a resin incorporating a plate-shaped filler from the extrusion apparatus 12. As a result, a resin panel 1 having desired rigidity could be obtained, without any occurrence of warpage.

Therefore, when a resin panel 1 in which ribs 3a are formed such that the longitudinal direction of the ribs 3a is non-parallel to the direction of flow of the resin that has been extruded and flowed out from an extrusion apparatus 12, is obtained by extruding a resin incorporating a plate-shaped filler from an extrusion apparatus 12, a resin panel 1 without warpage can be obtained while weight reduction and high rigidity of the resin panel 1 are promoted. Hereinafter, the resin panel 1 according to an aspect of the present invention will be explained in detail with reference to the attached drawings.

First Embodiment

<Configuration Example of Resin Panel 1>

First, a configuration example of the resin panel 1 of the present embodiment will be explained with reference to FIG. 1. FIG. 1 is a diagram illustrating a configuration example of the resin panel 1, FIG. 1(a) is an overall perspective view diagram of the resin panel 1, FIG. 1(b) is a top view diagram of the resin panel 1 illustrated in FIG. 1(a), FIG. 1(c) is an A-A' cross-sectional view diagram of the resin panel 1 illustrated in FIG. 1(a) and FIG. 1(b), and FIG. 1(d) is a B-B' cross-sectional view diagram of the resin panel 1 illustrated in FIG. 1(a) and FIG. 1(b).

Figure 1A:
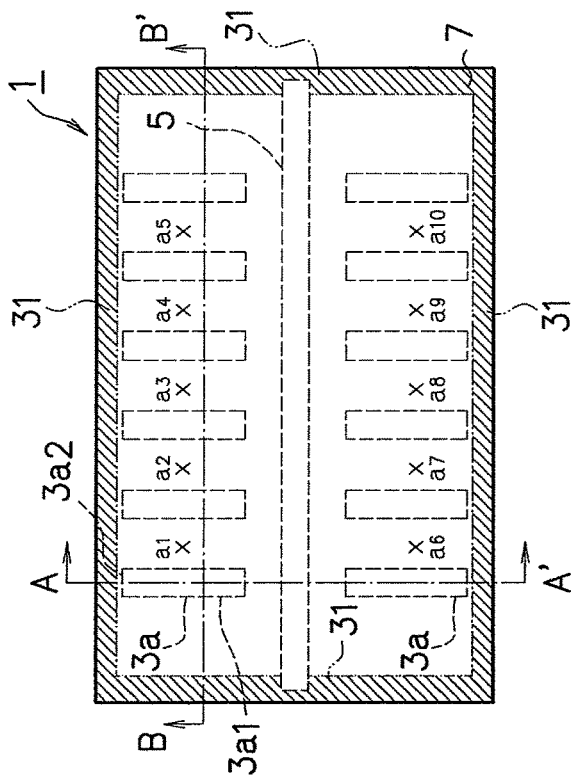
Figure 1B:
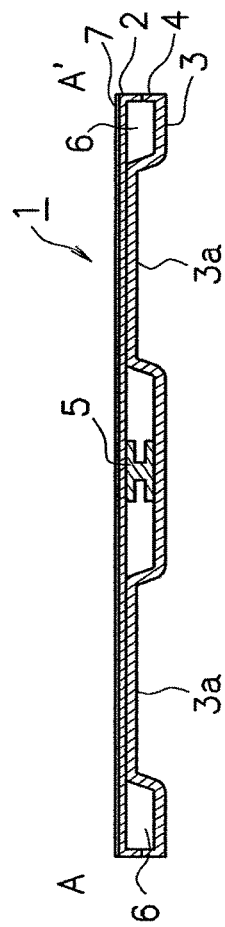

The resin panel 1 of the present embodiment is configured to include, as illustrated in FIG. 1(a), a front wall 2, a back wall 3, peripheral walls 4, and a reinforcing material unit 5. In the resin panel 1 of the present embodiment, as illustrated in FIG. 1(c) and FIG. 1(d), the front wall 2 and the back wall 3 face each other with a predetermined gap therebetween, and the peripheries of the front wall 2 and the back wall 3 are joined by the peripheral walls 4. Furthermore, the resin panel 1 has a hollow part 6 between the front wall 2 and the back wall 3, and the reinforcing material unit 5 is disposed between the front wall 2 and the back wall 3.

Figure 1C:
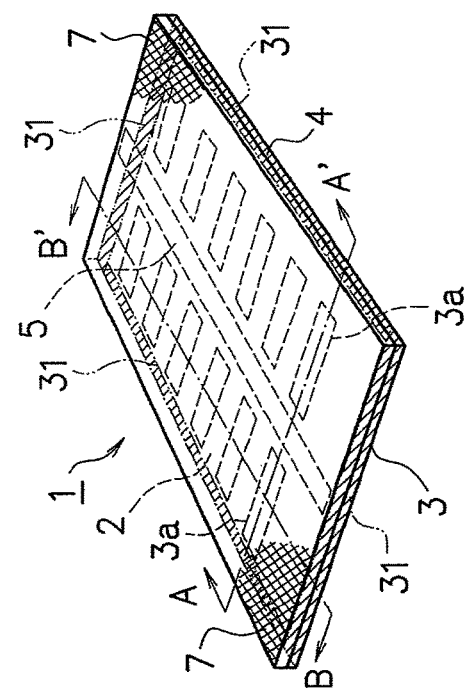
Figure 1D:
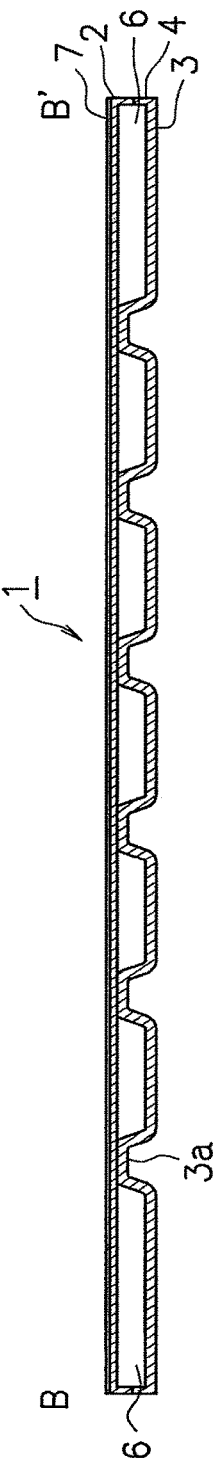
Figure 2:
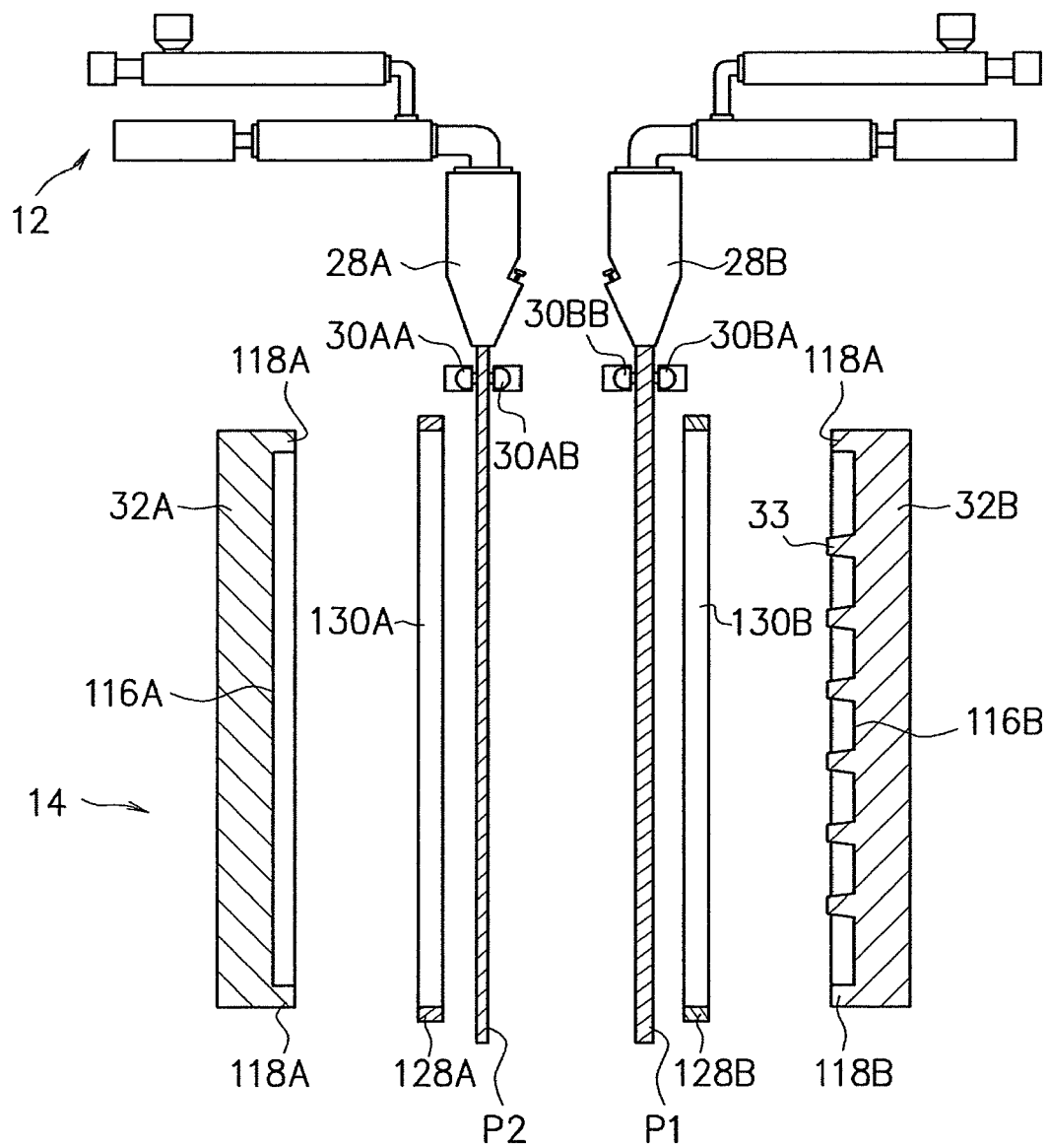
FIG. 2 is a diagram illustrating a configuration example of a molding apparatus for molding the resin panel 1 of the present embodiment.

Furthermore, in the resin panel 1 of the present embodiment, as illustrated in FIG. 1(a), a decorative member 7 for decoration or the like is adhered to the surface of the front wall 2, and as illustrated in FIG. 1(c) and FIG. 1(d), the back wall 3, the front wall 2 and the decorative member 7 constitute a laminate structure. In addition, it is also possible not to adhere the decorative member 7.

Furthermore, the resin panel 1 of the present embodiment is configured to include plural ribs 3a formed by having portions of the back wall 3 depressed toward the front wall 2 and welded to the inner surface of the front wall 2 to enhance the rigidity and strength of the resin panel 1. The ribs 3a of the present embodiment have bottoms, and the bottoms of the ribs 3a are welded to the inner surface of the front wall 2. FIG. 1 shows an example in which slit ribs are provided as the ribs 3a; however, it is also possible to provide inner ribs. Furthermore, the number of the ribs 3a is also not particularly limited, and any arbitrary number of ribs 3a can be provided according to the shape of the resin panel 1.

Regarding the shape of the ribs 3a, for example, as illustrated in FIG. 1(b), the ribs can be configured into any arbitrary shape as long as the shape is a shape having a longitudinal portion 3a1 and a transverse portion 3a2 in the shape of a rib 3a on the outer surface of the back wall 3. The longitudinal portion 3a1 is a portion that constitutes the longitudinal direction of the ribs 3a. The transverse portion is a portion that constitutes the transverse direction of the ribs 3a. The ribs 3a can be configured into, for example, a shape having a longitudinal portion and a transverse portion, such as a straight-line shape, a curve shape, a rectangular shape, or an elliptical shape. In FIG. 1(b), the transverse portion 3a2 of a rib 3a is in the direction of B-B'. The direction of B-B' is the direction of flow of the resins that constitute the back wall 3 and the front wall 2. In FIG. 1(b), the longitudinal portion 3a1 of a rib 3a is in the direction of A-A'. The direction of A-A' is in a direction that is perpendicular to the direction of flow B-B' of the resin.

The resin panel 1 of the present embodiment is constructed from a resin containing a plate-shaped filler, and also, the longitudinal portions 3a1 of the ribs 3a are formed in the direction A-A' that is perpendicular to the direction of flow B-B' of the resins. Therefore, a resin panel 1 in which warpage does not occur can be obtained. Examples of the plate-shaped filler include talc and mica, which have lower anisotropy than glass fibers. Meanwhile, in a case in which the longitudinal portions 3a1 of the ribs 3a are formed in a direction parallel to the direction of flow B-B' of the resins, a resin panel 1 in which warpage has occurred may be obtained depending on the resins that constitute the resin panel 1. The resin panel 1 illustrated in FIG. 1 is provided with two ribs 3a that are separated apart from each other in the direction A-A' that is perpendicular to the direction of flow B-B' of the resins. Meanwhile, there are no particular limitations on the number of the ribs 3a provided to be separated from each other in the direction A-A' that is perpendicular to the direction of flow B-B' of the resins, and any number of ribs 3a can be disposed.

Furthermore, the resin panel 1 of the present embodiment has a contact surface 31 on the back wall 3. The contact surface 31 is a portion which, for example, when the resin panel 1 is mounted on a certain member in a car, is brought into contact with that certain member, and the resin panel 1 is mounted on the certain member such that this contact surface 31 is brought into contact with the certain member. Accordingly, when a reinforcing material unit 5 is disposed so as to bridge over the contact surface 31, the strength of the resin panel 1 can be enhanced. Furthermore, the strength in the direction that is perpendicular to the longitudinal direction of the reinforcing material unit 5 can be enhanced. Meanwhile, the shape or position of the contact surface 31 is not limited to the flat shape or position illustrated in FIG. 1(a) and FIG. 1(b), and the shape or position can be arbitrarily altered depending on the contacting relationship between the resin panel 1 and the other member at the time of mounting the resin panel 1 on the certain member. For example, the resin panel 1 shown in FIG. 1 has a reinforcing material unit 5 disposed thereon; however, there is also available a configuration in which the reinforcing material unit 5 is not disposed. In this case, the resin panel 1 is configured so as to have the contact surface 31 on the extension lines of the longitudinal directions of the ribs 3a. Thereby, the strength of the resin panel 1 can be enhanced.

In the resin panel 1 of the present embodiment plural ribs 3a are formed on a back wall 3 having a contact surface 31, while weight reduction of the resin panel 1 is promoted. Therefore, in order to prevent the contact surface 31 of the back wall 3 from being easily deformed and easily cracking, the average thickness of the back wall 3 is configured to be in the range of from 1.1 mm to 1.7 mm. Also, since the front wall 2 does not have ribs 3a formed thereon unlike the case of the back wall 3, the average thickness of the front wall 2 is configured to be in the range of from 0.7 mm to 1.2 mm. Thereby, a resin panel 1 in which weight reduction of the resin panel 1 is promoted, and also, the contact surface 31 of the back wall 3 that is brought into contact with another member does not easily undergo deformation and cracking, can be obtained.

For example, when the average thickness of the back wall 3 is configured to be less than 1.1 mm, the portions that form the ribs 3a become further thinner. Therefore, pinholes may easily occur, or the contact surface 31 becomes prone to deformation or cracking. Accordingly, the average thickness of the back wall 3 is configured to be 1.1 mm or more. Also, when the average thickness of the back wall 3 is configured to be thicker than 1.7 mm, the back wall 3 becomes unnecessarily thick, and it is difficult to promote weight reduction of the resin panel 1. Furthermore, the thickness difference between the back wall 3 and the front wall 2 becomes large, the distance between the back wall 3 and the front wall 2 varies, and the contact surface 31 becomes prone to deformation. Accordingly, the average thickness of the back wall 3 is configured to be in the range of from 1.1 mm to 1.7 mm. Furthermore, the front wall 2 is also configured to have an average thickness of the front wall 2 in the range of from 0.7 mm to 1.2 mm, for a reason that is almost the same as that for the back wall 3. Thereby, weight reduction of the resin panel 1 is promoted, and also, a resin panel 1 in which the contact surface 31 of the back wall 3 that is brought into contact with another member does not easily undergo deformation or cracking, can be obtained. Meanwhile, regarding the resin panel 1 of the present embodiment, when the average thickness of the back wall 3 is configured to be in the range of from 1.1 mm to 1.7 mm, and the average thickness of the front wall 2 is configured to be in the range of from 0.7 mm to 1.2 mm, the weight of a molded article in a state without a decorative member 7 can be adjusted to 2.5 to 4.2 kg/m$^2$, weight reduction of the resin panel 1 can be promoted, and the contact surface 31 of the back wall 3 can be prevented from easily undergoing deformation or cracking. However, the weight of a molded article is such that the front wall 2 is lighter than the back wall 3.

Meanwhile, according to the present embodiment, the average thicknesses of the front wall 2 and the back wall 3 mean the average values of the thicknesses measured at at least 10 sites (provided that 10 sites of a1 to a10 illustrated in FIG. 1(*b*), at which ribs 3a are not formed) that are set apart at an approximately constant interval along the longitudinal directions of the front wall 2 and the back wall 3. For example, in the case of the configuration example of the resin panel 1 illustrated in FIG. 1, the average thickness the front wall 2 is the average value of the thicknesses measured at 10 sites of various areas a1 to a10, in which ribs 3a are not provided on the front wall 2, as illustrated in FIG. 1(*b*). For the back wall 3, the average thickness is the average value of the thicknesses measured at various areas at the positions that face the various areas a1 to a10 measured on the front wall 2.

The resin sheets P1 and P2 that constitute the front wall 2 and the back wall 3 are constructed using, for example, a material obtained by incorporating a plate-shaped filler into a resin such as a polyethylene resin, a polypropylene resin, an ethylene-vinyl acetate copolymer, a vinyl chloride resin, an ABS resin (acrylonitrile-styrene-butadiene resin), a polyamide resin, a polystyrene resin, a polyester resin, a polycarbonate resin or a modified polyphenylene ether, or a mixed resin obtained by blending these resins. Examples of the plate-shaped filler include talc and mica, which have lower anisotropy than glass fibers. Furthermore, for the front wall 2 and the back wall 3, it is preferable to use a resin material having high melt tension, from the viewpoint of preventing the occurrence of fluctuations in the thickness caused by draw-down or neck-in. Also, it is preferable to use a resin material having high fluidity in order to obtain satisfactory transferability and conformity to the mold. Meanwhile, in order to promote high rigidity of the resin panel 1, it is preferable to use a plate-shaped filler. This is because it has been discovered by repeating various experiments that rigidity of the resin panel 1 can be enhanced by using a plate-shaped filler.

Regarding the material that constitutes the decorative member 7, any known material can be applied. For example, the material can be appropriately selected from knitted fabrics, woven fabrics and nonwoven fabrics obtainable by processing natural fibers, reproduced fibers, semi-synthetic fibers, synthetic fibers, and fibers formed from blends thereof; or resin sheets formed from polyvinyl chloride (PVC), thermoplastic elastomers (TPEs) such as a thermoplastic polyurethane elastomer (TPU) and a thermoplastic polyolefin elastomer (TPO), a thermoplastic resin such as a polyethylene resin and polyolefin resin, and laminate sheets of these resin sheets.

Regarding the material that constitutes the reinforcing material unit 5, any known material can be applied. For example, materials made of metals (aluminum and the like) or materials made of hard plastics can be applied. Furthermore, the shape of the reinforcing material unit 5 is also not limited to the shape illustrated in FIG. 1, and can be configured into any arbitrary shape. For example, the shape can also be configured into a shape such as a cylindrical shape, a C-shape, or a U-shape. However, since the resin panel 1 illustrated in FIG. 1 has ribs 3a formed on the back wall 3, it is necessary to dispose the reinforcing material unit 5 at a site where ribs 3a are not formed.

<Example of Method for Molding Resin Panel 1>

Next, an example of the method for molding the resin panel 1 of the present embodiment will be explained with reference to FIG. 2 to FIG. 10. FIG. 2 illustrates a configuration example of the molding apparatus for molding the resin panel 1, and FIG. 3 to FIG. 10 are diagrams illustrating examples of processes for molding the resin panel 1, which illustrate the state in which the resin sheet P and the split mold 32 are viewed from the T-die 28 side of the extrusion apparatus shown in FIG. 2.

The resin panel 1 of the present embodiment can be molded using the molding apparatus illustrated in FIG. 2. The molding apparatus illustrated in FIG. 2 has an extrusion apparatus 12 and a mold-clamping apparatus 14, and the resin panel 1 illustrated in FIG. 1 is molded by sending out resin sheets P1 and P2 in a molten state, which have been extruded from the extrusion apparatus 12, to the mold-clamping apparatus 14, and clamping the resin sheets P1 and P2 with the mold-clamping apparatus 14. The resin sheet P1 constitutes the back wall 3, and the resin sheet P2 constitutes the front wall 2.

In the resin panel 1 of the present embodiment, since ribs 3a are formed on the back wall 3, as illustrated in FIG. 2 to FIG. 10, plural protrusions 33 for forming the ribs 3a are provided in the cavity 116B of one split mold part 32B that is intended for molding the back wall 3 side. The protrusions 33 are configured into a shape corresponding to the ribs 3a formed on the back wall 3, and are provided in the cavity 116B so as to protrude toward the other split mold part 32A that is intended for molding the front wall 2 side. The protrusions 33 illustrated in FIG. 2 form the ribs 3a in the longitudinal direction of the resin panel 1 illustrated in FIG. 1, and the protrusions 33 illustrated in FIG. 3 to FIG. 10 form the ribs 3a in the transverse direction of the resin panel 1 illustrated in FIG. 1.

Furthermore, in the resin panel 1 of the present embodiment, since the back wall 3 is configured to be relatively thicker than the front wall 2, the thickness of the resin sheet P1 that constitutes the back wall 3 is made thicker than that of the resin sheet P2 that constitutes the front wall 2. Hereinafter, the example of the method for molding the resin panel 1 of the present embodiment will be explained in detail.

Figure 3:
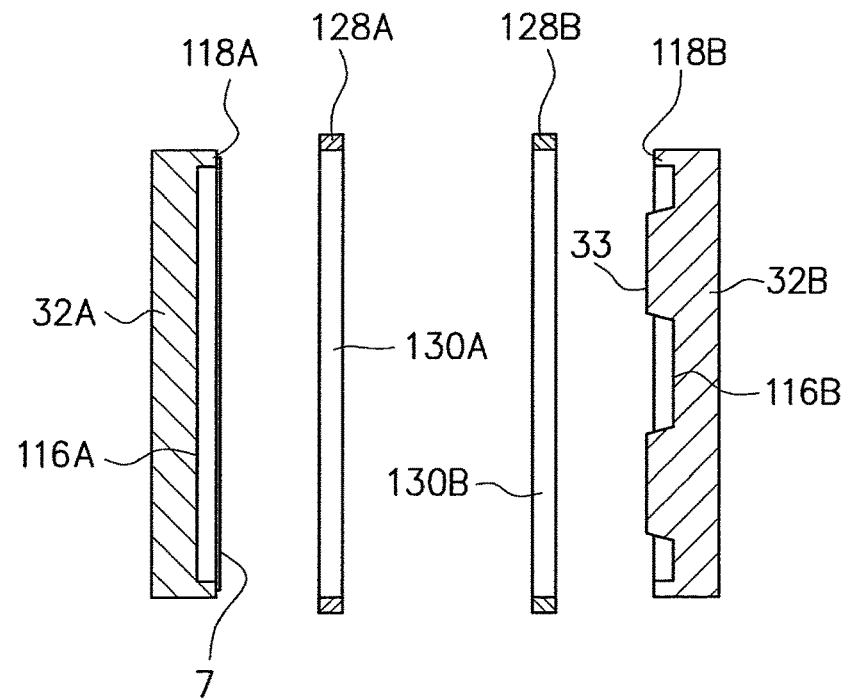
FIG. 3 is a first diagram illustrating a molding process example for the resin panel 1.

As illustrated in FIG. 1, in a case in which a decorative member 7 is provided on the surface of the front wall 2, as illustrated in FIG. 3, a sheet-like decorative member 7 is temporarily fixed by means of temporary locking pins provided on the split mold part 32A, so as to cover the cavity 116A of the split mold part 32A.

Next, as illustrated in FIG. 2, the resin sheets P1 and P2 are extruded from the T-die 28 of the extrusion apparatus 12, and the extruded resin sheets P1 and P2 are passed through between a pair of rollers 30 to adjust the thicknesses of the resin sheets P1 and P2. The resin sheets P1 and P2 are suspended between a pair of split mold parts 32.

The extrusion capacity of the extrusion apparatus 12 is appropriately selected from the viewpoints of the size of the resin panel 1 to be molded, and prevention of the occurrence of draw-down or neck-in of the resin sheets P1 and P2. More specifically, from the viewpoint of practical use, the amount of extrusion of one shot in intermittent extrusion is preferably 1 to 10 kg, and the extrusion rate of the resin sheets P1 and P2 through an extrusion slit is several hundred kg/hour or more, and more preferably 700 kg/hour or more. Furthermore, from the viewpoint of preventing the occurrence of draw-down or neck-in of the resin sheets P1 and P2, it is preferable that the extrusion process for the resin sheets P1 and P2 is as short as possible, and although the duration is dependent on the kind, the MFR value and the MT value of the resin, it is desirable that the extrusion process is generally completed within 40 seconds, and more preferably within 10 to 20 seconds. For this reason, the amount of extrusion of the resin sheets P1 and P2 per unit area and unit time through an extrusion slit is 50 kg/hour-cm$^2$ or more, and more preferably 150 kg/hour-cm$^2$ or more.

The extrusion apparatus 12 of the present embodiment performs extrusion such that the second molten resin sheet P2 that constitutes the front wall 2 becomes thinner than the first molten resin sheet P1 that constitutes the back wall 3, so as to make the thickness of the front wall 2 approximately equal to or thinner than the thickness of the back wall 3, and to make the front wall 2 lighter than the back wall 3. For example, the thickness of the resin sheet P2 that constitutes the front wall 2 is adjusted such that the average thickness of the front wall 2 of the resin panel 1 as a final molded article is in the range of from 0.7 mm to 1.2 mm. Furthermore, the resin sheet P1 that constitutes the back wall 3 is adjusted such that the average thickness of the back wall 3 of the resin panel 1 as a final molded article is in the range of from 1.1 mm to 1.7 mm. The thicknesses of the resin sheets P1 and P2 can be changed by adjusting the gap of the extrusion slit, the gap of the roller 30, and the rotation speed of the roller 30.

However, regarding the resin sheets P1 and P2, it is preferable to use a resin material having high melt tension from the viewpoint of preventing the occurrence of variation in the thickness due to draw-down, neck-in or the like, and it is preferable to use a resin material having high fluidity in order to obtain satisfactory transferability and conformity to the split mold 32. For example, the resin sheets P1 and P2 are formed using a polyolefin which is a homopolymer or a copolymer of olefins such as ethylene, propylene, butene, isoprene, pentene, and methylpentene (for example, polypropylene or a high-density polyethylene), and has a MFR at 230° C. (measured according to JIS K-7210 at a test temperature of 230° C. under a test load of 2.16 kg) of 3.0 g/10 minutes or less, and more preferably 0.3 to 1.5 g/10 minutes; or a non-crystalline resin such as an acrylonitrile-butadiene-styrene copolymer, polystyrene, a high impact polystyrene (HIPS resin), or an acrylonitrile-styrene copolymer (AS resin), which has a MFR at 200° C. (measured according to JIS K-7210 at a test temperature of 200° C. under a test load of 2.16 kg) of 3.0 to 60 g/10 min, and more preferably 30 to 50 g/10 min, and has a melt tension at 230° C. (represents the tension obtainable when a strand is extruded using a melt tension tester manufactured by Toyo Seiki Seisakusho, Ltd., through an orifice having a diameter of 2.095 mm and a length of 8 mm at a remaining heat temperature of 230° C. and an extrusion rate of 5.7 mm/min, and this strand is wound around a roller having a diameter of 50 mm at a winding speed of 100 rpm) of 50 mN or more, and preferably 120 mN or more.

The molding apparatus of the present embodiment is capable of extension-thinning of the resin sheets P1 and P2 by sending out the resin sheets P1 and P2 that are interposed between a pair of rollers 30 downward by the rotation of the pair of rollers 30, and can prevent the occurrence of draw-down or neck-in by adjusting the relative speed difference between the extrusion speed of the resin sheets P1 and P2 and the discharge speed at which the resin sheets P1 and P2 are conveyed downwards by means of the pair of rollers 30. Therefore, the restrictions on the kind of the resin, particularly the MFR value and the MT value, or the amount of extrusion per unit time can be diminished.

Figure 4:
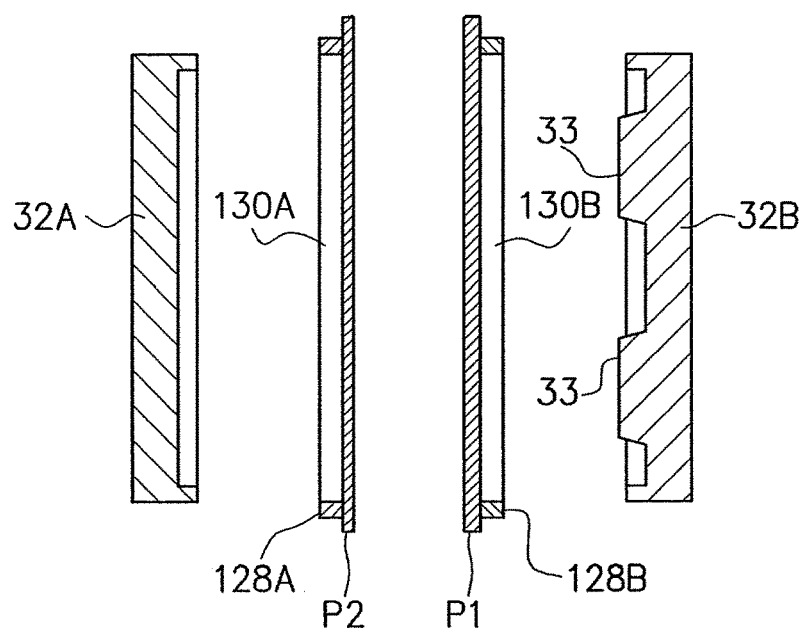
FIG. 4 is a second diagram illustrating a molding process example for the resin panel 1.

In the molding apparatus of the present embodiment, the resin sheets P1 and P2 are disposed between split mold parts 32, and framing members 128 are moved by a framing member driving apparatus toward the corresponding resin sheets P1 and P2. As illustrated in FIG. 4, the framing members 128 are brought into contact with the resin sheets P1 and P2, and the resin sheets P1 and P2 are retained by the framing members 128. The framing members 128 have holes 130, and the resin sheets P1 and P2 are retained by the framing members 128.

Figure 5:
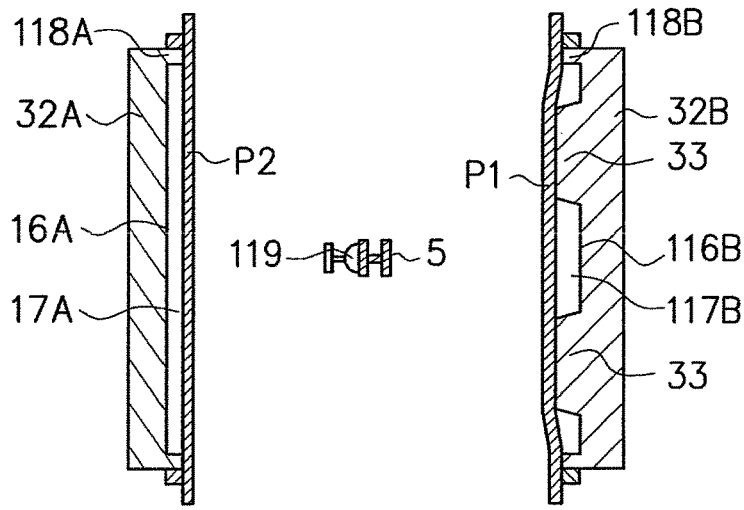
FIG. 5 is a third diagram illustrating a molding process example for the resin panel 1.

Next, the framing members 128 are moved toward the split mold parts 32, and as illustrated in FIG. 5, the resin sheets P1 and P2 are brought into contact with pinch-off units 118 of the split mold parts 32, and a sealed space 117 is formed by the resin sheets P1 and P2, the pinch-off units 118, and the cavity 116. Furthermore, a reinforcing material unit 5 (see FIG. 1) retained by a suction disk 119 of a manipulator is inserted between the split mold parts 32, as shown in FIG. 5. The reinforcing material unit 5 illustrated in FIG. 5 corresponds to the reinforcing material unit 5 illustrated in FIG. 1(c). The position at which the reinforcing material unit 5 is retained by the suction disk 119 is not particularly limited, and the reinforcing material unit 5 can be retained at any arbitrary position.

Figure 6:
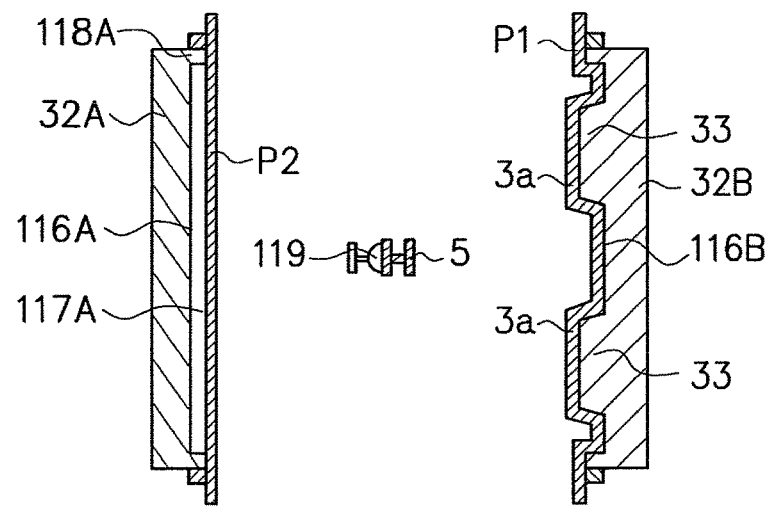
FIG. 6 is a fourth diagram illustrating a molding process example for the resin panel 1.

Next, the interior of the sealed space 117B is suctioned through the split mold 32B, the resin sheet P1 that constitutes the back wall 3 is pressed against the cavity 116B, and as illustrated in FIG. 6, the resin sheet P1 that constitutes the back wall 3 is shaped into the shape conforming to the concavo-convex surface of the cavity 116B. In the interior of the split mold 32B of the present embodiment, a vacuum suction chamber is provided. The vacuum suction chamber is in communication with the cavity 116B through a suction port, and the resin sheet P1 is suction-attached toward the cavity 116B by suctioning from the vacuum suction chamber through the suction port. Thus, the resin sheet P1 is shaped into a shape conforming to the outer surface of the cavity 116B. Furthermore, ribs 3a are formed on the outer surface of the resin sheet P1 by means of the protrusion 33 provided on the outer surface of the cavity 116B. Thereby, plural ribs 3a are formed on the resin sheet P1.

Figure 7:
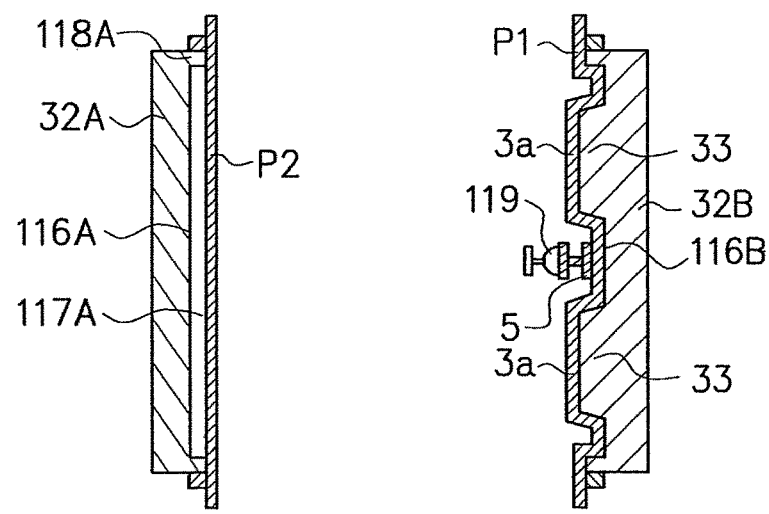
FIG. 7 is a fifth diagram illustrating a molding process example for the resin panel 1.

Furthermore, the manipulator is moved toward the split mold part 32B, and as illustrated in FIG. 7, a reinforcing material unit 5 is pressed against the resin sheet P1 that has been suction-attached to the cavity 116B of the split mold part 32B to adhere the reinforcing material unit 5 to the resin sheet P1. At this time, the reinforcing material unit 5 is adhered to the resin sheet P1 such that the both ends of the reinforcing material unit 5 are positioned on the contact surface 31 (see FIG. 1) of the back wall 3.

The resin sheets P1 and P2 of the present embodiment contain large amounts of a plate-shaped filler in order to increase the rigidity of the resin panel 1. When a resin containing a large amount of filler is used for blow molding, elongation of the resin is poor. Therefore, it is difficult to form a resin panel 1 having the ribs 3a shown in FIG. 1. Particularly, when the resin contains 20% or more of a filler for blow molding, it is difficult to mold the resin panel 1. In this regard, in the present embodiment, the resin sheets P1 and P2 in a molten state, which have been extruded from an extrusion apparatus 12, are suctioned on the surface of the cavity 116 of the split mold 32, the resin sheets P1 and P2 are shaped into the shape conforming to the cavity 116 using the molding apparatus illustrated in FIG. 2, and thereby the resin panel 1 is molded. Therefore, even if the resin contains a large amount of filler, the resin panel 1 having ribs 3a as illustrated in FIG. 1 can be easily molded. When the molding apparatus illustrated in FIG. 2 is used, the plate-shaped filler can be incorporated in an amount in the range of 20% to 50%.

Examples of the plate-shaped filler used to mold the resin panel 1 of the present embodiment include talc and mica, which have lower anisotropy than glass fibers. The plate-shaped filler is incorporated into the molding resin in an amount of 20 wt % to 50 wt %, and preferably 25 wt % to 40 wt %.

In the present embodiment, before the resin sheets P1 and P2, which have been extruded in a molten state through a T-die 28 of an extrusion apparatus 12, are formed by melt kneading the resins with the extrusion apparatus, the materials that respectively constitute the resin sheets P1 and P2 are dry blended. Therefore, it is preferable that the resins used for the resin sheets P1 and P2 are configured to include resins that can endure the drying temperature (about 80° C.) during a process for drying the dry blend. Examples of resins of this kind include PP (polypropylene resin) and PE (polyethylene resin). However, in regard to PE, HDPE (high density polyethylene) is preferred to LLDPE (linear low density polyethylene). Regarding the resins used for the resin sheets P1 and P2, it is preferable to use a mixed resin of PP+PE. Meanwhile, it is also possible to incorporate a coloring material into the resin sheets P1 and P2.

Next, the suction disk 119 is detached from the reinforcing material unit 5, and while the manipulator is pulled out from between the two split mold parts 32, the resin sheet P2 that constitutes the front wall 2 is pressed against the cavity 116A at the same time. Thus, as illustrated in FIG. 8, the resin sheet P2 is shaped into the shape conforming to the cavity 116A. Meanwhile, a vacuum suction chamber is also provided inside the split mold part 32A of the present embodiment, and the vacuum suction chamber is in communication with the cavity 116A through a suction port. When suctioning from the vacuum suction chamber is achieved through the suction port, the resin sheet P2 is suction-attached toward the cavity 116A, and the resin sheet P2 is shaped into the shape conforming to the outer surface of the cavity 116A.

Next, the two split mold parts 32 are clamped by a mold driving apparatus, and as illustrated in FIG. 9, the reinforcing material unit 5 and the ribs 3a are pressed against the resin sheet P2 suction-attached to the cavity 116A of the split mold part 32A, and the reinforcing material unit 5 and the ribs 3a are adhered to the resin sheet P2. Furthermore, the peripheries of the two sheets of resin sheets P1 and P2 are welded together, and a parting line PL is formed.

Meanwhile, in the present embodiment, when the split mold parts 32 are clamped, and the resin panel 1 in which the reinforcing material unit 5 and the resin sheets P1 and P2 are integrated is molded, it is preferable to compress the reinforcing material unit 5 and the resin sheets P1 and P2 by means of the split mold 32. Thereby, the adhesive strength between the reinforcing material unit 5 and the resin sheets P1 and P2 can be further enhanced.

Through the above-described procedure, the resin panel 1 molded by sandwiching a reinforcing material unit 5 between resin sheets P1 and P2 in a molten state is completely produced.

Figure 10:
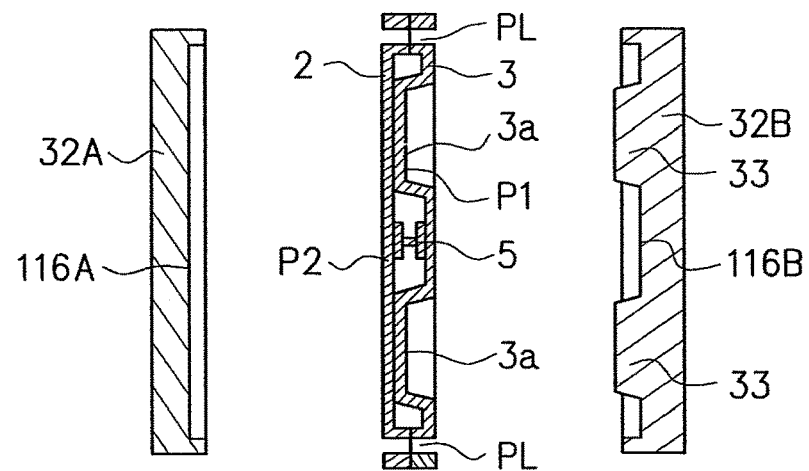
FIG. 10 is an eighth diagram illustrating a molding process example for the resin panel 1.

Next, as illustrated in FIG. 10, the two split mold parts 32 are unclamped, the cavity 116 is separated from the completed resin panel 1, and burrs formed around the parting line PL are removed. Thus, molding of the resin panel 1 illustrated in FIG. 1 is completed.

<Operation/Effect of Resin Panel 1 of Present Embodiment>

As such, in a case in which the resin panel 1 of the present embodiment is molded, first, as illustrated in FIG. 2, the resin panel 1 illustrated in FIG. 1, which is to be finally molded, is extruded from an extrusion apparatus 12 such that the thickness of the front wall 2 is approximately the same as or becomes thinner than the thickness of the back wall 3, and the front wall 2 becomes lighter than the back wall 3, and such that the second molten resin sheet P2 that constitutes the front wall 2 becomes thinner than the first molten resin sheet P1 that constitutes the back wall 3.

Next, as illustrated in FIG. 6, the first resin sheet P1 is shaped into the shape conforming to the cavity 116E of the split mold part 32B, and the first resin sheet P1 is expanded into the shape conforming to protrusions 33 to form ribs 3a. Thereby, ribs 3a are formed in the first resin sheet P1 that constitutes the back wall 3.

Next, as illustrated in FIG. 7, the reinforcing material unit 5 is adhered to the first resin sheet P1 in which the ribs 3a have been formed.

Next, as illustrated in FIG. 9, the pair of split mold parts 32 are clamped, the peripheries of the first resin sheet P1 that constitutes the back wall 3 and the second resin sheet P2 that constitutes the front wall 2 are welded together, and also, the tips of the ribs 3a formed in the first resin sheet P1 are welded to the second resin sheet P2. Furthermore, the reinforcing material unit 5 is adhered to the second resin sheet P2. Thereby, the resin panel 1 illustrated in FIG. 1 can be molded.

In the resin panel 1 of the present embodiment, the back wall 3, the front wall 2, and the ribs 3a are configured by mold-clamping, with a split mold 32, a first resin sheet P1 in a molten state and incorporating a plate-shaped filler, which constitutes the back wall 3, and a second resin sheet P2 in a molten state and incorporating a plate-shaped filler, which constitutes the front wall 2, and a resin panel 1 in which the longitudinal direction of the ribs 3a is non-parallel to the direction of flow of the first resin sheet P1 and the second resin sheet P2, is constructed.

Therefore, the resin panel 1 according to an aspect of the present embodiment can give a resin panel 1 without warpage, while weight reduction and high rigidity of the resin panel are promoted.

EXAMPLES

Next, specific Examples related to the resin panel 1 described above will be explained. However, the following Examples are only for illustrative purpose, and the technical idea of the present embodiment is not intended to be limited to the following Example only.

FIG. 11 is a diagram illustrating the configuration of the resin panel 1 of the present Example. FIG. 11(a) is an overall perspective view diagram of the resin panel 1, and illustrates the state in which the back wall 3 faces upward. FIG. 11(b) is an F-F' cross-sectional view diagram illustrated in FIG. 11(a), and FIG. 11(c) is an E-E' cross-sectional view diagram illustrated in FIG. 11(a). The resin panel 1 illustrated in FIG. 11 can be molded using the molding apparatus illustrated in FIG. 2 described above. In FIG. 11, T represents the direction of flow of the resin for molding the resin panel 1, and R represents the direction that is perpendicular to the direction of flow of the resin. R also represents the longitudinal direction of the ribs 3a.

The resin panel 1 of the present Example is configured to include a front wall 2, a back wall 3, and peripheral walls 4. The resin panel 1 of the present Example is such that, as illustrated in FIGS. 11(b) and 11(c), the front wall 2 and the back wall 3 face each other with a predetermined space therebetween, and the peripheries of the front wall 2 and the back wall 3 are joined by the peripheral walls 4. Furthermore, the resin panel 1 has a hollow part 6 between the front wall 2 and the back wall 3. The resin panel 1 of the present Example has been constructed without using a reinforcing material unit 5 or a decorative member 7 as in the case of the resin panel 1 illustrated in FIG. 1. Furthermore, the ribs 3a are formed such that the longitudinal direction of the ribs 3a on the outer surface of the backwall 3 is in a direction R perpendicular to the direction of flow T of the resin. Furthermore, plural ribs 3a are formed to be separated from each other in the direction R that is perpendicular to the direction of flow T of the resin. Also, the plural ribs 3a that are formed to be separated from each other are formed jaggedly and alternately in the direction of flow T of the resin. The resin panel 1 of the present Example has an external shape which measures about 1080 mm×510 mm, and has contact surfaces 31 along the entire periphery.

Example 1

A resin panel 1 illustrated in FIG. 11, whose recommended weight of a finished product was 3000 g/m², was molded using resin sheets P1 and P2 of the following talc-blended material.

Talc blend: a mixed resin of PP (polypropylene resin)+PE (polyethylene resin) mixed with 30% of talc.

The resin panel 1 of Example 1 did not have any warpage occurred therein.

The resin panel 1 of Example 1 was supported by bringing the resin panel 1 into contact with another member at the contact surface 31 having an inner dimension of 1000 mm×440 mm, which was provided around the entire periphery of the back wall 3. Then, weighting with a predetermined weight was applied at the center position of the resin panel 1 illustrated in FIG. 11(a), using a load of ϕ60 mm in a normal temperature environment (23° C.±2° C.), and the displacement of the resin panel 1 was measured after several seconds. Furthermore, a test was conducted to see whether the resin panel 1 had a desired rigidity. The center position of the resin panel 1 is the position of an intersection point at which the center in the longitudinal direction of the resin panel 1 crosses the center in the transverse direction of the resin panel 1. The resin panel 1 of Example 1 underwent only a small deflection. Also, it was found that the resin panel 1 had the desired rigidity.

Comparative Example 1

Figure 13:
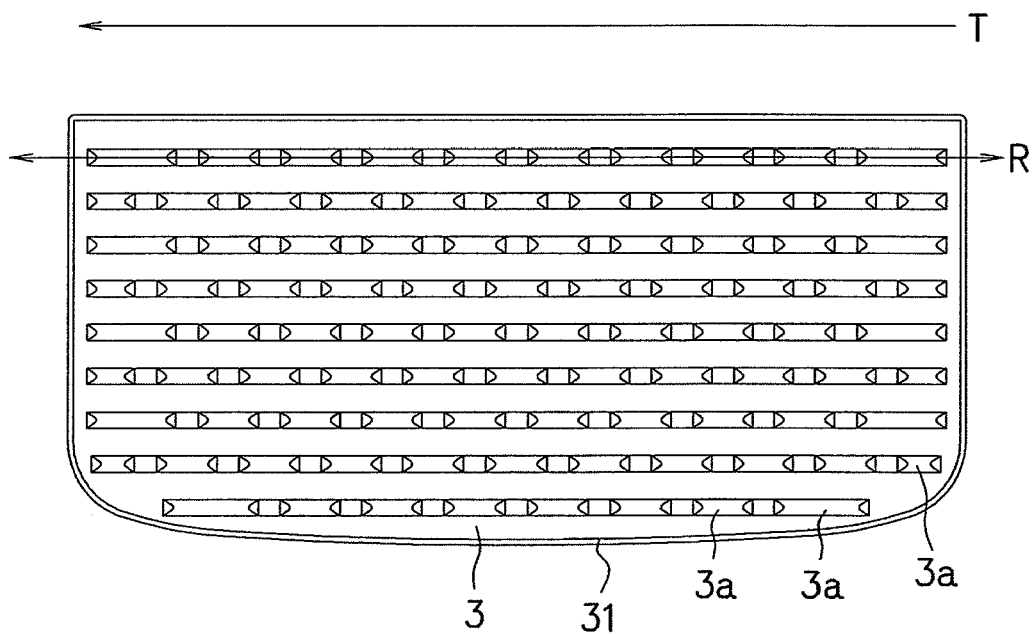
FIG. 13 is a diagram illustrating a configuration example of the resin panel in a case in which ribs 3a are formed such that the longitudinal direction of the ribs is parallel to the direction of flow of the resin.

A resin panel illustrated in FIG. 13, whose recommended weight of a finished product was 3000 g/m², was molded using resin sheets P1 and P2 of the same talc-blended material as the material of Example 1. In the resin panel illustrated in FIG. 13, the longitudinal direction R of the ribs 3a is formed to be parallel to the direction of flow T of the resin, unlike the resin panel 1 illustrated in FIG. 11. Comparative Example 1 is different only in that the longitudinal direction of the ribs 3a of Example 1 was directed to be parallel to the direction of flow T of the resin.

The resin panel of Comparative Example 1 did not have any warpage occurred therein.

The resin panel of Comparative Example 1 was supported by bringing the resin panel into contact with another member at the contact surface 31 having an inner dimension of 1000 mm×440 mm, which was provided around the entire periphery of the back wall 3. Then, weighting with a predetermined weight was applied at the center position of the resin panel illustrated in FIG. 13, using a load of ϕ60 mm in a normal temperature environment (23° C.±2° C.), and the displacement of the resin panel was measured after several seconds. Furthermore, a test was conducted to see whether the resin panel had a desired rigidity. The resin panel of Comparative Example 1 had extensive deflection compared to Example 1. Also, it was found that the resin panel did not have the desired rigidity.

Comparative Example 2

A resin panel illustrated in FIG. 11, whose recommended weight of a finished product was 3000 g/m², was molded using resin sheets P1 and P2 of the following glass-blended material. Comparative Example 2 is different only in that the talc incorporated into the resin sheets P1 and P2 of Example 1 was replaced with short glass fibers.

Glass blend: a mixed resin of PP (polypropylene resin)+ PE (polyethylene resin) mixed with 30% of short glass fibers. The short glass fibers were glass fibers having a fiber length of 0.2 to 0.5 mm.

The resin panel of Comparative Example 2 did not have any warpage occurred therein.

The resin panel of Comparative Example 2 was supported by bringing the resin panel into contact with another member at the contact surface 31 having an inner dimension of 1000 mm×440 mm, which was provided around the entire periphery of the back wall 3. Then, weighting with a predetermined weight was applied at the center position of the resin panel illustrated in FIG. 11(a), using a load of φ60 mm in a normal temperature environment (23° C.±2° C.), and the displacement of the resin panel was measured after several seconds. Furthermore, a test was conducted to see whether the resin panel had a desired rigidity. The resin panel of Comparative Example 2 had extensive deflection compared to Example 1. Also, it was found that the resin panel did not have the desired rigidity.

Comparative Example 3

A resin panel illustrated in FIG. 13, whose recommended weight of a finished product was 3000 g/m$^2$, was molded using resin sheets P1 and P2 of the same glass-blended material as the material of Comparative Example 2. In the resin panel illustrated in FIG. 13, the longitudinal direction R of the ribs 3a is formed to be parallel to the direction of flow T of the resin, unlike the resin panel 1 illustrated in FIG. 11. Comparative Example 3 is different only in that the longitudinal direction of the ribs 3a L of Comparative Example 2 was directed to be parallel to the direction of flow T of the resin.

The resin panel of Comparative Example 3 had warpage occurred therein.

The resin panel of Comparative Example 3 was supported by bringing the resin panel into contact with another member at the contact surface 31 having an inner dimension of 1000 mm×440 mm, which was provided around the entire periphery of the back wall 3. Then, weighting with a predetermined weight was applied at the center position of the resin panel illustrated in FIG. 13, using a load of φ60 mm in a normal temperature environment (23° C.±2° C.), and the displacement of the resin panel was measured after several seconds. Furthermore, a test was conducted to see whether the resin panel had a desired rigidity. The resin panel of Comparative Example 3 had extensive deflection compared to Example 1. Also, it was found that the resin panel had the desired rigidity. The resin panel of Comparative Example 3 had the desired rigidity because the glass fibers having anisotropy were oriented in the direction of flow T of the resin, and the direction of orientation of the glass fibers became parallel to the longitudinal direction of the ribs 3a. However, in the case of the resin panel of this Comparative Example 3, warpage occurred significantly, and therefore, the resin panel is not preferable for manufactured products.

The test results of Example 1 and Comparative Examples 1 to 3 are presented in FIG. 12.

As is obvious from the test results presented in FIG. 12, it was found that when a resin panel 1 is molded with resin sheets P1 and P2 having talc incorporated therein such that the longitudinal direction of the ribs 3a is formed in a direction R that perpendicularly intersects the direction of flow T of the resin as illustrated in FIG. 11, warpage does not occur in the resin panel 1, and a resin panel 1 having a desired rigidity is obtained.

Second Embodiment

Next, the second embodiment will be explained.

The first embodiment was described on the premise of a case in which an identical material is used in the resin sheets P1 and P2.

In the second embodiment, a case in which different materials are used in the resin sheets P1 and P2 will be described. Specifically, a case in which the resin sheet P2 uses a material having higher impact resistance than that of the resin sheet P1, will be described. First, an outline of the resin panel 1 of the second embodiment will be explained with reference to FIG. 1, FIG. 2, FIG. 8, and FIG. 9. FIG. 1 illustrates a configuration example of the resin panel 1, FIG. 2 illustrates a configuration example of a molding apparatus for molding the resin panel 1 illustrated in FIG. 1, and FIG. 8 and FIG. 9 illustrate parts of the process for molding the resin panel 1.

The resin panel 1 of the present embodiment is, as illustrated in FIG. 1, a resin panel 1 including a back wall 3, and a front wall 2 facing the back wall 3 with a gap therebetween.

In the resin panel 1 of the present embodiment, for example, the back wall 3 and the front wall 2 are configured by mold-clamping, in a split mold 32, a resin sheet P1 in a molten state, which constitutes the back wall 3, and a resin sheet P2 in a molten state, which constitutes the front wall 2, the resin sheet P1 and the resin sheet P2 being extruded from the extrusion apparatus 12 illustrated in FIG. 2, and the resin sheet P2 is formed from a material having higher impact resistance than that of the resin sheet P1, while the front wall 2 is formed from a material having higher impact resistance than that of the back wall 3.

To mold the resin panel 1 of the present embodiment, first, as illustrated in FIG. 2, the resin sheet P1 in a molten state, which constitutes the back wall 3, and the resin sheet P2 in a molten state, which constitutes the front wall 2, the resin sheet P1 and the resin sheet P2 having been extruded from an extrusion apparatus 12, are suspended between a pair of split mold parts 32.

Next, illustrated in FIG. 8, the resin sheet P1 and the resin sheet P2 were suction-attached to the surface of a cavity 116 of the split mold 32, and the resin sheet P1 and the resin sheet P2 are shaped into the shape conforming to the cavity 116.

Next, as illustrated in FIG. 9, the split mold 32 is clamped, and thus the resin panel 1 is molded.

In the resin panel 1 of the present embodiment, since the resin sheet P2 that constitutes the front wall 2 is formed from a material having higher impact resistance than that of the resin sheet P1 that constitutes the back wall 3, a resin panel 1 in which weight reduction and impact resistance of the resin panel 1 have been enhanced, can be obtained. Hereinafter, the resin panel 1 of the present embodiment will be explained in detail with reference to the attached drawings.

<Configuration Example of Resin Panel 1>

First, a configuration example of the resin panel 1 of the present embodiment will be explained with reference to FIG. 1. FIG. 1 is a diagram illustrating a configuration example of the resin panel 1, in which FIG. 1(a) is an overall perspective view diagram of the resin panel 1, FIG. 1(b) is a top view diagram of the resin panel 1 illustrated in FIG. 1(a), FIG. 1(c) is an A-A' cross-sectional view diagram of the resin panel 1 illustrated in FIG. 1(*a*) and FIG. 1(*b*), and FIG. 1(*d*) is a B-B' cross-sectional view diagram of the resin panel 1 illustrated in FIG. 1(*a*) and FIG. 1(*b*).

The resin panel 1 of the present embodiment is configured to include, as illustrated in FIG. 1(*a*), a front wall 2, a back wall 3, peripheral walls 4, and a reinforcing material unit 5. In the resin panel 1 of the present embodiment, as illustrated in FIGS. 1(*c*) and 1(*d*), the front wall 2 and the back wall 3 face each other with a predetermined gap therebetween, and the peripheries of the front wall 2 and the back wall 3 are joined by the peripheral walls 4. Furthermore, the resin panel 1 has a hollow part 6 between the front wall 2 and the back wall 3, and the reinforcing material unit 5 is disposed between the front wall 2 and the back wall 3.

The resin sheet P2 that constitutes the front wall 2 of the present embodiment is constructed from a resin material having higher impact resistance than that of the resin sheet P1 that constitutes the back wall 3, in order for the resin sheet P2 to endure strong impact while securing rigidity. For the resin sheet P2 that constitutes the front wall 2, for example, a material obtained by incorporating a long filament fibrous filler into a resin such as a polyethylene resin, a polypropylene resin, an ethylene-vinyl acetate copolymer, a vinyl chloride resin, an ABS resin (acrylonitrile-styrene-butadiene resin), a polyamide resin, a polystyrene resin, a polyester resin, a polycarbonate resin or a modified polyphenylene ether, or a mixed resin obtained by blending these resins, is used. The long filament fibrous filler means a filler having a fiber length of 3 to 12 mm. An example of a filler of this kind is long filament glass fibers having a fiber length of 3 to 12 mm. Meanwhile, the resin sheet P2 that constitutes the front wall 2 can also be constructed using a pulverized material obtained by pulverizing the burrs generated when the resin panel 1 is molded. Burrs may be used with discriminating the resin sheet P2 that constitutes the front wall 2 and the resin sheet P1 that constitutes the back wall 3; however, the burrs may also be used without discriminating the resin sheets. In the case of discriminating burrs, burrs of the resin sheet P2 that constitutes the front wall 2 are used. A material suitable for the resin sheet P2 that constitutes the front wall 2 is, for example, a material obtained by incorporating 50% of a pulverized material into a virgin material composed of a polypropylene resin+30% of long filament (fiber length 3 to 12 mm) glass fibers+an elastomer. By using a virgin material, incorporation of a filler having a long filament fiber length can be secured.

Furthermore, the resin sheet P1 that constitutes the back wall 3 is constructed from a resin material having superior moldability than that of the resin sheet P2 that constitutes the front wall 2, in order to obtain the moldability necessary for forming the ribs 3*a*, while securing rigidity. For the resin sheet P1 that constitutes the back wall 3, for example, a material obtained by incorporating a fibrous filler having a shorter fiber length than the long filament fibrous filler that is included in the resin sheet P2, into the same resin as that of the resin sheet P2 described above, is used. Examples of a filler of this kind include glass fibers produced by pulverizing glass fibers having a fiber length of 3 to 12 mm, which are used in the resin sheet P2, and shortening the fiber length; and short fiber glass fibers having a fiber length of 0.2 to 0.5 mm. Meanwhile, the resin sheet P1 that constitutes the back wall 3 can also be constructed using a pulverized material obtained by pulverizing the burrs generated when the resin panel 1 is molded. In this case, the resin sheet P1 is configured to include a larger amount of the pulverized material than the resin sheet P2 is. The burrs can be used without discriminating the resin sheet P2 that constitutes the front wall 2 and the resin sheet P1 that constitutes the back wall 3. Examples of a suitable material for the resin sheet P1 that constitutes the back wall 3 include materials composed only of pulverized materials. The long filament fibrous filler that is included in the resin sheet P2 undergoes shortening of the fiber length during the course of pulverization of the burrs generated after kneading, extrusion and molding with the extrusion apparatus 12 that will be described below. Therefore, the resin sheet P1 can use a pulverized material only. The resin sheet P1 is not only constructed only from a pulverized material, but also can be constructed by adding a virgin material composed of a polypropylene resin+30% of short fiber (fiber length 0.2 to 0.5 mm) glass fibers+an elastomer.

The resin panel 1 of the present embodiment can be molded using the molding apparatus illustrated in FIG. 2, as in the case of the first embodiment. The molding apparatus illustrated in FIG. 2 has an extrusion apparatus 12 and a mold-clamping apparatus 14, and the resin panel 1 illustrated in FIG. 1 is molded by sending out resin sheets P1 and P2 in a molten state, which have been extruded from the extrusion apparatus 12, to the mold-clamping apparatus 14, and clamping the resin sheets P1 and P2 with the mold-clamping apparatus 14. The resin sheet P1 constitutes the back wall 3, and the resin sheet P2 constitutes the front wall 2. The molding apparatus illustrated in FIG. 2 can produce the resin sheet P2 that constitutes the front wall 2 and the resin sheet P1 that constitutes the back wall 3 using respectively different material blends.

For the resin sheet P2 that constitutes the front wall 2, a material having a long filament fibrous filler incorporated therein is used in order for the resin sheet to endure strong impact while securing rigidity. The long filament fibrous filler means a filler having a fiber length of 3 to 12 mm. An example of a filler of this kind is long filament glass fibers having a fiber length of 3 to 12 mm.

For the resin sheet P1 that constitutes the back wall 3, a material in which a fibrous filler having a shorter fiber length than the long filament fibrous filler included in the resin sheet P1 is incorporated is used, in order to obtain the moldability necessary for forming the ribs 3*a* while securing rigidity. Examples of a filler of this kind include glass fibers obtained by pulverizing glass fibers having a fiber length of 3 to 12 mm, which are used in the resin sheet P2, and shortening the fiber length; and short fiber glass fibers having a fiber length of 0.2 to 0.5 mm.

When a resin containing a large amount of filler is used for blow molding, elongation of the resin becomes poor. Therefore, it is difficult to form the resin panel 1 having ribs 3*a* illustrated in FIG. 1. In this regard, in the present embodiment, a resin panel 1 is molded using the molding apparatus illustrated in FIG. 2, by suctioning resin sheets P1 and P2 in a molten state, which have been extruded from the extrusion apparatus 12, to the surface of the cavity 116 of a split mold 32, and shaping the resin sheets P1 and P2 into the shape conforming to the cavity 116. Therefore, even if the resin contains a large amount of filler, the resin panel 1 having ribs 3*a* as illustrated in FIG. 1 can be easily molded. The filler is incorporated in an amount of 20 wt % to 50 wt %, and preferably 25 wt % to 40 wt %, with respect to the molding resin. The fibrous filler is oriented in the direction of extrusion of the resin sheets P1 and P2.

For the resin sheet P2 that constitutes the front wall 2, a material may be used that includes, for example, 60% of a virgin material composed of a polypropylene resin+30% of long filament glass fibers+an elastomer, and 40% of a pulverized material obtained by pulverizing burrs that are generated when the resin panel 1 is molded. Also, for the resin sheet P1 that constitutes the back wall 3, a material may be used that includes, for example, a material composed of 100% of a pulverized material obtained by pulverizing burrs that are generated when the resin panel 1 is molded.

In a case in which the resin panel 1 is molded using the resin sheet P2 that constitutes the front wall 2 and the resin sheet P1 that constitutes the back wall 3, which have been extruded from an extrusion apparatus 12, about 30% of the resin sheets P1 and P2 extruded from the extrusion apparatus 12 becomes molded articles, while the remaining 70% becomes burrs. In the present embodiment, the resin sheets P1 and P2 are produced using pulverized materials obtained by pulverizing these burrs. The fibers included in the resin sheets P1 and P2 have the fiber lengths shortened in the course of kneading and extrusion with the extrusion apparatus 12, and pulverization of burrs. Therefore, the burrs generated in the course of molding the resin panel 1 can be used as a recycled material. Meanwhile, it is not necessary to discriminate the burrs used for the resin sheet P2 that constitutes the front wall 2 and the resin sheet P1 that constitutes the back wall 3.

The resin sheet P2 that constitutes the front wall 2, which has been extruded from the extrusion apparatus 12, is designated as 100, and the resin sheet P1 that constitutes the back wall 3 is designated as 100. In this case, 70 out of 100 of the resin sheet P2 that constitutes the front wall 2, which has been extruded from the extrusion apparatus 12, becomes burrs. Also, 70 out of 100 of the resin sheet P1 that constitutes the back wall 3 becomes burrs. Therefore, among 200 of the resin sheets P1 and P2, 60 becomes the resin panel 1, and the remaining 140 becomes burrs. A pulverized material obtained by pulverizing 100 of the burrs among this 140 of burrs is used for the resin sheet P1 that constitutes the back wall 3. Meanwhile, if the resin sheet P1 is constructed from 100% of the pulverized material, mixing of raw materials becomes unnecessary, and therefore, the equipment cost can be reduced. Furthermore, a pulverized material produced by pulverizing the remaining 40 of the burrs is used for the resin sheet P2 that constitutes the front wall 2. The remaining 60 of the resin sheet P2 uses a virgin material composed of a polypropylene resin+30% of long filament (fiber length 3 to 12 mm) glass fibers+an elastomer. By using a virgin material, deterioration of the resin that constitutes the resin panel 1 can be avoided. Regarding the polypropylene resin that constitutes this virgin material, a polyethylene resin or a mixed resin of a polypropylene resin and a polyethylene resin can also be used.

Furthermore, a pulverized material obtained by pulverizing 90 of burrs among the 140 of burrs can be used for the resin sheet P1 that constitutes the back wall 3. In this case, a virgin material composed of a polypropylene resin+30% of short fiber (fiber length 0.2 to 0.5 mm) glass fibers+an elastomer can be used as the remaining 10 of the resin sheet P1. As such, in a case in which the resin sheet P1 is not constructed using only the pulverized material, short fibers can also be added. A polyethylene resin or a mixed resin of a polypropylene resin and a polyethylene resin can also be used as substitute for the polypropylene resin that constitutes this virgin material. Furthermore, a pulverized material obtained by pulverizing the remaining 50 of burrs is used for the resin sheet P2 that constitutes the front wall 2. The remaining 50 of the resin sheet P2 can be constructed using a virgin material composed of a polypropylene resin+30% of long filament (fiber length 3 to 12 mm) glass fibers+an elastomer.

Meanwhile, it is also possible to keep the amount of addition of the fibers that are added to the resin sheet P2 that constitutes the front wall 2 and the resin sheet P1 that constitutes the back wall 3, constant irrespective of the length of the fibers, while making the resin sheet P2 that constitutes the front wall 2 and the resin sheet P1 that constitutes the back wall 3 different only in the average fiber length.

<Operation/Effects of Resin Panel 1 of Present Embodiment>

As such, to mold the resin panel 1 of the present embodiment, first, as illustrated in FIG. 2, the molten resin sheet P1 and P2 are extruded from the extrusion apparatus 12 by adjusting the thickness of the second molten resin sheet P2 that constitutes the front wall 2 to be thinner than the thickness of the first molten resin sheet P1 that constitutes the back wall 3, so that the thickness of the front wall 2 in the resin panel 1 illustrated in FIG. 1, which is finally molded, becomes approximately the same as or thinner than the thickness of the back wall 3, and the front wall 2 is lighter than the back wall 3.

Next, as illustrated in FIG. 6, the first resin sheet P1 is shaped into the shape conforming to the cavity 116B of the split mold part 32B, and the first resin sheet P1 is expanded into the shape conforming to the protrusions 33 to form ribs 3a. Thereby, the ribs 3a are formed on the first resin sheet P1 that constitutes the back wall 3.

Next, as illustrated in FIG. 7, a reinforcing material unit 5 is adhered to the first resin sheet P1 on which the ribs 3a are formed.

Next, as illustrated in FIG. 9, a pair of split mold parts 32 are clamped, the peripheries of the first resin sheet P1 that constitutes the back wall 3 and the second resin sheet P2 that constitutes the front wall 2 are welded together, and also the tips of the ribs 3a formed on the first resin sheet P1 are welded to the second resin sheet P2. Furthermore, the reinforcing material unit 5 is adhered to the second resin sheet P2. Thereby, the resin panel 1 illustrated in FIG. 1 can be molded.

In the resin panel 1 of the present embodiment, the second resin sheet P2 that constitutes the front wall 2 is constructed from a material having higher impact resistance than that of the first resin sheet P1 that constitutes the back wall 3, and the front wall 2 is constructed from a material having higher impact resistance than that of the back wall 3. For example, the second resin sheet P2 that constitutes the front wall 2 is configured to include a long filament filler, and the first resin sheet P1 that constitutes the back wall 3 is configured to include a filler having a shorter fiber length than that of the long filament filler included in the second resin sheet P2.

When a long filament fibrous filler is incorporated into the resin sheet, impact resistance is enhanced, but moldability is decreased. On the other hand, when a short fiber fibrous filler is incorporated into the resin sheet, moldability is enhanced, but impact resistance is decreased. Therefore, in the present embodiment, the second resin sheet P2 that constitutes the front wall 2 is configured to include a long filament filler, and the first resin sheet P1 that constitutes the back wall 3 is configured to include a filler having a shorter fiber length than that of the long filament filler included in the second resin sheet P2. Thereby, a resin panel 1 in which weight reduction and impact resistance of the resin panel 1 have been enhanced can be obtained.

In the embodiment described above, in regard to the resin panel 1 illustrated in FIG. 1, the thickness of the front wall 2 is made approximately the same or thinner than the thickness of the back wall 3. However, it is also possible to construct the front wall 2 from a material having higher impact resistance than the back wall 3, regardless of the relationship between the thickness of the front wall 2 and the thickness of the back wall 3. In the present embodiment, the materials that constitute the front wall 2 and the back wall 3 are made different from each other, and the front wall 2 is constructed from a material having higher impact resistance than that of the back wall 3. Therefore, further thinning can be promoted as compared to the case of constructing the front wall 2 and the back wall 3 from an identical material, and weight reduction can be promoted. As a result, a resin panel in which weight reduction and impact resistance of the resin panel have been enhanced can be obtained.

Furthermore, in the embodiment described above, the front wall 2 is constructed from a material having higher impact resistance than that of the back wall 3, by configuring the front wall 2 to include a long filament (fiber length 3 to 12 mm) filler, and configuring the back wall 3 to include a filler having a shorter fiber length than that of the long filament filler that constitutes the front wall 2. However, it is also possible to configure the front wall 2 and the back wall 3 to include a short fiber (fiber length 0.2 to 0.5 mm) filler, while configuring the front wall 2 to include a smaller amount of the short fiber (fiber length 0.2 to 0.5 mm) filler than in the back wall 3, and to construct the front wall 2 from a material having higher impact resistance than that of the back wall 3. For example, the front wall 2 is configured to include 10% of a short fiber (fiber length 0.2 to 0.5 mm) filler, and the back wall 3 is configured to include 30% of a short fiber (fiber length 0.2 to 0.5 mm) filler. In this case, since the elastic force of the front wall 2 is increased, a resin panel in which weight reduction and impact resistance of the resin panel have been enhanced can be obtained. Also, it is also possible to make the impact resistance of the front wall 2 higher than that of the back wall 3 by using a material having an elastic force in the front wall 2. Examples of the material having an elastic force include LLDPE (linear low density polyethylene), SEBS (hydrogenated styrene-based elastomer), and a polyethylene-based elastomer. In this case as well, a resin panel in which weight reduction and impact resistance of the resin panel have been enhanced can be obtained.

Meanwhile, the various embodiments described above are suitable embodiments of the present invention. The scope of the present invention is not intended to be limited to the embodiments described above, and the present invention can be carried out in the form of various variations to the extent that the gist of the present invention is maintained.

For example, in the various embodiments described above, explanations have been given by taking one sheet of resin panel 1 as an example. However, for example, it is also possible to configure a resin panel in which a first resin panel and a second resin panel are joined by means of hinges.

Furthermore, in the various embodiments described above, a reinforcing material unit 5 was disposed inside the resin panel 1 by adhering the reinforcing material unit 5 to resin sheets P1 and P2 in a molten state and mold-clamping the resin sheets. However, it is also possible to, after the resin panel 1 is molded, dispose the reinforcing material unit 5 inside the resin panel 1 by inserting the reinforcing material unit 5 through the lateral sides of the resin panel. However, as illustrated in FIG. 1, in the case of a rectangular-shaped reinforcing material unit 5, the reinforcing material unit can also be inserted through the lateral sides of the resin panel 1 after molding; however, in the case of a shape of the reinforcing material unit such as a trapezoidal shape configured by plural reinforcing materials that respectively face different directions, it is preferable that the resin panel is molded by adhering a reinforcing material unit having a trapezoidal shape to the resin sheets P1 and P2 in a molten state, similarly to the molding method of the embodiment described above.

Furthermore, in the various embodiments described above, as illustrated in FIG. 1, a reinforcing material unit 5 was disposed inside the resin panel 1. However, as illustrated in FIG. 11, it is also possible not to dispose the reinforcing material unit 5.

DESCRIPTION OF REFERENCE NUMERALS

1 Resin panel
2 Front wall
3 Back wall
3a Rib
3a1 Longitudinal portion
3a2 Transverse portion
31 Contact surface
4 Peripheral wall
5 Reinforcing material unit
6 Hollow part
7 Decorative member

The invention claimed is:

1. A molding method of molding, using a pair of split mold parts, a resin panel having a back wall; a front wall facing the back wall with a gap therebetween; and ribs formed by having portions of the back wall depressed toward the front wall and welded to the inner surface of the front wall,
the method comprising:
suspending, between a pair of split mold parts, a first molten resin in a molten state and incorporating a plate-shaped filler, which constitutes the back wall, and a second molten resin in a molten state and incorporating a plate-shaped filler, which constitutes the front wall, the first molten resin and the second molten resin having been extruded and flowed out from an extrusion apparatus, the first molten resin and the second molten resin are each a mixed resin of polypropylene resin and polyethylene resin;
suctioning the first molten resin and the second molten resin to the cavity surface of the split mold parts, and shaping the first molten resin and the second molten resin into a shape conforming to the cavity; and
clamping the split mold parts, and molding the resin panel in which the longitudinal direction of the ribs is formed to be perpendicular to the direction of flow of the first molten resin and the second molten resin, and in which the ribs are formed to be separated from each other in the direction perpendicular to the direction of flow of the first molten resin and the second molten resin, and the ribs are formed separated from each other and formed jaggedly and alternately in the direction of flow of the first molten resin and the second molten resin.

2. The molding method according to claim 1, wherein the plate-shaped filler is talc.

3. The molding method according to claim 1, wherein the cavity of one of the split mold parts is provided with protrusions for forming the ribs, the protrusions protruding toward the other split mold part, and
the shaping involves extending the first molten resin into a shape conforming to the protrusions and thereby forming the ribs.

4. The molding method according to claim 2, wherein the cavity of one of the split mold parts is provided with protrusions for forming the ribs, the protrusions protruding toward the other split mold part, and the shaping involves extending the first molten resin into a shape conforming to the protrusions and thereby forming the ribs.

5. The molding method according to claim 1, wherein the molding includes molding the resin panel without a reinforcing material unit.

\* \* \* \* \*